United States Patent
Majeed et al.

(10) Patent No.: US 12,465,585 B2
(45) Date of Patent: Nov. 11, 2025

(54) COMPOSITIONS FOR THE MANAGEMENT OF SEIZURE INDUCED NEUROTOXICITY

(71) Applicants: Muhammed Majeed, Bangalore (IN); Kalyanam Nagabhushanam, East Windsor, NJ (US)

(72) Inventors: Muhammed Majeed, Bangalore (IN); Kalyanam Nagabhushanam, East Windsor, NJ (US)

(73) Assignee: SAMI-SABINSA GROUP LIMITED, Bangalore (IN)

( * ) Notice: Subject to any disclaimer, the term of this patent is extended or adjusted under 35 U.S.C. 154(b) by 1168 days.

(21) Appl. No.: 17/365,519

(22) Filed: Jul. 1, 2021

(65) Prior Publication Data

US 2021/0322370 A1 Oct. 21, 2021

Related U.S. Application Data

(63) Continuation-in-part of application No. 16/801,257, filed on Feb. 26, 2020, now abandoned, which is a continuation-in-part of application No. 16/441,465, filed on Jun. 14, 2019, now Pat. No. 10,959,980.

(60) Provisional application No. 62/685,400, filed on Jun. 15, 2018.

(51) Int. Cl.
| | | |
|---|---|---|
| A61K 31/353 | (2006.01) | |
| A61K 9/00 | (2006.01) | |
| A61P 25/08 | (2006.01) | |

(52) U.S. Cl.
CPC .......... *A61K 31/353* (2013.01); *A61K 9/0053* (2013.01); *A61P 25/08* (2018.01)

(58) Field of Classification Search
CPC ...... A61P 25/08; A61K 31/352; A61K 31/353
See application file for complete search history.

(56) References Cited

U.S. PATENT DOCUMENTS

2018/0360801 A1* 12/2018 Majeed .................. A61P 39/00

FOREIGN PATENT DOCUMENTS

| WO | WO-2004016265 A1 * | 2/2004 | .......... A61K 31/352 |
| WO | WO-2005042782 A1 * | 5/2005 | ......... A01K 67/0275 |
| WO | WO-2007038610 A2 * | 4/2007 | .......... A61K 36/232 |

* cited by examiner

*Primary Examiner* — Sarah Pihonak

(57) ABSTRACT

The present invention discloses a composition comprising not less than 10% w/w of oroxylin A, not less than 10% w/w of baicalein and not less than 2% w/w of chrysin for use reducing the incidence of seizures and in the management of neurotoxicity induced by seizures.

4 Claims, 5 Drawing Sheets

COMPOSITIONS FOR THE MANAGEMENT OF SEIZURE INDUCED NEUROTOXICITY

CROSS-REFERENCE TO RELATED PATENT APPLICATIONS

This application is a continuation-in-part of U.S. patent application Ser. No. 16/801,257 filed on 26 Feb. 2020, which is a continuation-in-part of U.S. patent application Ser. No. 16/441,465 filed on 14 Jun. 2019, patented on 30 Mar. 2021 with patent no. U.S. Ser. No. 10/959,980, which in turn is a non-provisional filing of U.S. provisional patent application No. 62/685,400 filed on 15 Jun. 2018, which is being incorporated herein in its entirety.

BACKGROUND OF THE INVENTION

Field of the Invention

The invention in general relates to compositions for therapeutic management of epilepsy and hypertriglyceridemia. Specifically the present invention relates to therapeutic management of epilepsy and hypertriglyceridemia using a composition comprising oroxylin A, baicalein and chrysin (OBC). More specifically, the invention relates to the management of neurotoxicity induced due to epileptic seizures using a composition comprising oroxylin A, baicalein and chrysin (OBC).

Description of Prior Art

Triglycerides are a class of lipid molecules which are stored in the fat cells and released at the time of energy requirement. The body converts the calories into triglycerides and stores in the adipocytes. Hypertriglyceridemia is a clinical condition wherein there is an increase in circulating levels of triglycerides. If the calorie intake exceeds the output, there will be an increase in the levels of triglycerides in blood.

Evidence indicates that elevated triglyceride levels contribute to the increased risk of cardiovascular disease and stroke. Hypertriglyceridemia is associated with an increased risk of acute pancreatitis. The following prior art documents discuss about the causes and effects of hypertriglyceridemia
a) Yuan et al., Hypertriglyceridemia: its etiology, effects and treatment, CMAJ. 2007; 176(8): 1113-1120.
b) Robertson S, Hypertriglyceridemia Cause and Symptoms, https://www.news-medical.net/health/Hypertriglyceridemia-Cause-and-Symptoms.aspx, accessed 10 Jun. 2019
c) John D. Brunzell, Hypertriglyceridemia, N Engl J Med 2007; 357:1009-1017
d) Ceriello et al., Evidence for an Independent and Cumulative Effect of Postprandial Hypertriglyceridemia and Hyperglycemia on Endothelial Dysfunction and Oxidative Stress Generation, Circulation. 2002; 106:1211-1218

Hypertriglyceridemia is often co-morbid with and/or indicate other clinical conditions like diabetes, hyperglycemia, hypothyroidism, metabolic syndrome, obesity, and genetic conditions. It is also present as a side effect of taking certain medications like, chemotherapeutics, diuretics, steroids, beta blockers etc, which can be easily reversed (Triglycerides: Why do they matter?, Mayo Clinic, https://www.mayoclinic.org/diseases-conditions/high-blood-cholesterol/in-depth/triglycerides/art-20048186, accessed 10 Jun. 2019). There are many treatment strategies employed for the management and treatment of hypertriglyceridemia. Natural molecules that can decrease the levels of triglycerides in blood are now being increasingly evaluated. Some of the natural molecules that are reported to reduce triglyceride levels are listed below:
1. Rideout et al., Triglyceride-Lowering Response To Plant Sterol and Stanol Consumption, J AOAC Int. 2015; 98(3): 707-715.
2. Schonewille et al., Serum TG-lowering properties of plant sterols and stanols are associated with decreased hepatic VLDL secretion, J Lipid Res. 2014; 55(12): 2554-2561.
3. Vallianou et al., Camphene, a Plant-Derived Monoterpene, Reduces Plasma Cholesterol and Triglycerides in Hyperlipidemic Rats Independently of HMG-CoA Reductase Activity, PLoS ONE 6(11): e20516.
4. Majeed et al., Composition comprising scirpusin A and scirpusin B and anti-obesity potential thereof, U.S. patent Ser. No. 10/172,903.
5. Majeed et al., Method for the treatment of hypercholesterolemia, U.S. Pat. No. 9,610,273

Epilepsy is a brain disorder characterized by the presence of epileptic seizures, generated by the neurobiologic, cognitive, psychological, and social consequences (Fisher et el., Epileptic seizures and epilepsy: definitions proposed by the International League Against Epilepsy (ILAE) and the International Bureau for Epilepsy (IBE), Epilepsia. 2005 April; 46(4): 470-2). It is a condition with a transient occurrence of signs and/or symptoms due to abnormal excessive or synchronous neuronal activity in the brain. Most epileptic seizures are characterised by reduced locomotion, increased muscle rigidity, salivation, teeth grinding, clonus and repetitive head/leg movement. There are many types of seizures namely absence seizures (formerly known as petit mal), tonic-clonic or convulsive seizures (formerly known as grand mal), atonic seizures (also known as drop attacks), clonic seizures, tonic seizures and myoclonic seizures.

The causes for the development of seizure are manifold. It varies with age and other pathological conditions. The epilepsy foundation of USA discloses the different causes of development of epileptic seizures (https://www.epilepsy.com/learn/about-epilepsy-basics/what-causes-epilepsy-and-seizures) in newborn, children, adults and in seniors with stroke, trauma and neurodegenerative disorders like Alzheimer's disease. The common causes of seizures in newborns include brain malformations, lack of oxygen during birth, low levels of blood sugar, blood calcium, blood magnesium or other electrolyte problem, inborn errors of metabolism, intracranial hemorrhage and maternal drug use. In children and adults it occurs due to fever (febrile seizures), brain tumor (rarely), infections, congenital conditions (down's syndrome; angelman's syndrome; tuberous sclerosis and neurofibromatosis), genetic and biochemical factors and deficiencies, progressive brain disease (rare) and head trauma.

The treatment modalities for the management of epileptic seizures include administration of drugs according to the type of seizure, age, sex and other medical conditions. However, most of the anti-epileptic drugs cause many side effects which include tiredness, dizziness, weight gain, thinning bones, rashes, clumsiness, trouble talking, trouble remembering things, trouble thinking, mood changes, and weight loss. A natural and safe alternative is warranted to ameliorate the symptoms of epilepsy. Plant derived molecules for the management of epilepsy have been already reported. However, there is a lack of evidence for efficacy and toxicity for most of the molecules. Plants and plant derived molecules obtained from *Lavandula officinalis, Zizyphus jujube, Taxus wallichiana Zucc, Ganoderma lucidum, Uncaria rhynchophylla* have been reported to be effective in the management of epilepsy. (Wei Liu et al., The effects of herbal medicine on epilepsy, Oncotarget. 2017 Jul. 18; 8(29): 48385-48397). Bioactive flavones isolated from *Sculellaria baicalensis* have been tested for convulsion related activities. Baicalin exhibited anticonvulsant effects in electrogenic response score system and the pentylenetetrazole seizure model. (Yoon et al., Convulsion-related activities of *Scutellaria* flavones are related to the 5,7-dihydroxyl structures, Eur J Pharmacol. 2011 Jun. 1; 659 (2-3):155-60).

However, a natural molecule and/or a combination of natural molecules that is effective in reducing epileptic seizures and decrease triglycerides, especially in hypertriglyceridemia induced by chemotherapeutics and hyperglycemia are lacking. The present invention solves the above problem by disclosing a composition for management of epilepsy and hypertriglyceridemia.

Further, in addition to preventing the occurrence of new episodes of seizures it is imperative to address the neurotoxic effects induced by epilepsy for the complete management of the disease. Not all drugs which prevent the occurrence of seizures offer a complete protection by addressing the neurotoxic effects. The composition comprising oroxylin A, baicalein and chrysin as disclosed in the present invention is effective in preventing seizure activity and in managing the neurotoxic effects induced by epilepsy.

It is a principle objective of the invention to disclose a method for therapeutic management of epilepsy using a composition comprising oroxylin A, baicalein and chrysin.

It is another objective of the invention to disclose a method for therapeutic management of neurotoxicity induced by epilepsy using a composition comprising oroxylin A, baicalein and chrysin.

It is another objective of the invention to disclose a method for therapeutic management of hypertriglyceridemia using a composition comprising oroxylin A, baicalein and chrysin.

The invention fulfils the above mentioned objective and provides further related advantages.

SUMMARY OF THE INVENTION

The present invention discloses a composition comprising not less than 10% w/w of oroxylin A, not less than 10% w/w of baicalein and not less than 2% w/w of chrysin for use in the therapeutic management of epileptic seizures and in the management of neurotoxicity induced by seizures. The invention also discloses the use of a composition comprising not less than 10% w/w of oroxylin A, not less than 10% w/w of baicalein and not less than 2% w/w of chrysin for use in the therapeutic management hypertriglyceridemia associated with chemotherapy and hyperglycemia.

DESCRIPTION OF THE MOST PREFERRED EMBODIMENTS

Figure 1:
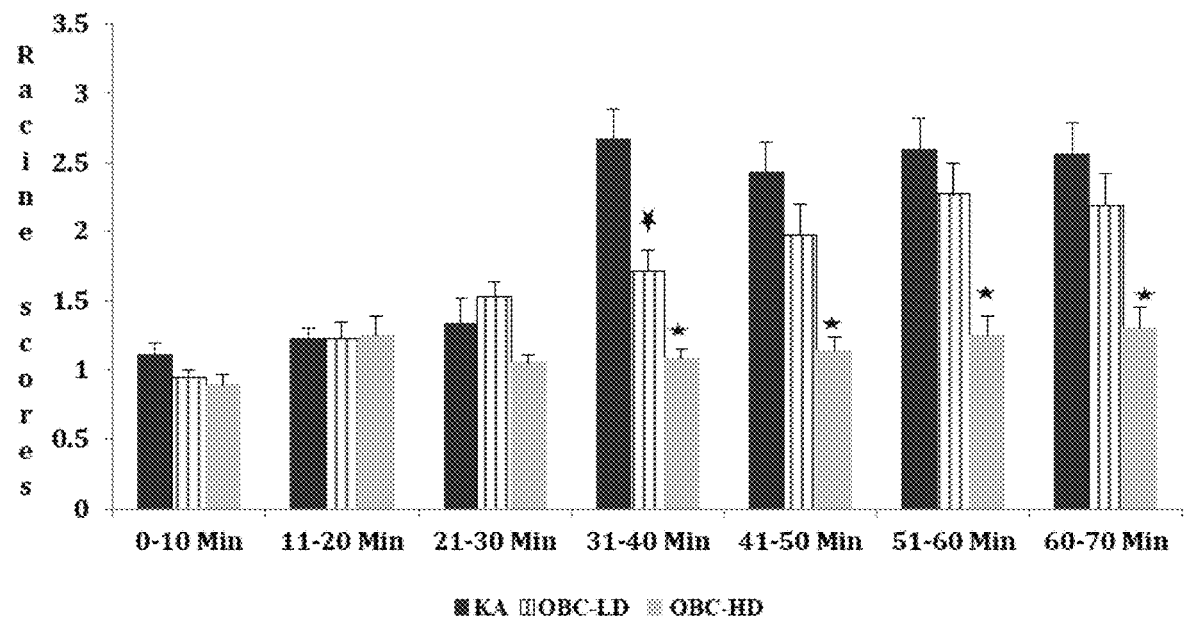
FIG. 1 is graphical representation of effect of composition comprising oroxylin A, baicalein and chrysin (OBC) (250 and 500 mg/kg, oral administration, 2 weeks) on the kainic acid (KA)-induced seizures as seen by the decrease in Racine score with increase in concentration of the composition.

In the most preferred embodiment the invention discloses a method of therapeutic management of hypertriglyceridemia in mammals, said method comprising steps of administering effective concentration of a composition comprising not less than 10% w/w of oroxylin A, not less than 10% w/w of baicalein and not less than 2% w/w of chrysin, to mammals in need of such therapeutic management. In a related embodiment, the composition preferably comprises 10%-15% w/w of oroxylin A, 10%-25% w/w of baicalein and 2%-10% w/w of chrysin. In a related embodiment, hypertriglyceridemia is caused by chemotherapeutics and hyperglycemia. In a preferred embodiment, the mammal is human. In another preferred embodiment, the composition is formulated with pharmaceutically/nutraceutically acceptable excipients, adjuvants, diluents or carriers and administered orally in the form of tablets, capsules, syrups, gummies, powders, suspensions, emulsions, chewables, candies and eatables.

In another preferred embodiment, the invention discloses a composition comprising not less than 10% w/w of oroxylin A, not less than 10% w/w of baicalein and not less than 2% w/w of chrysin, for use in the therapeutic management of hypertriglyceridemia in mammals. In a related embodiment, the composition preferably comprises 10%/6-15% w/w of oroxylin A, 10%-25% w/w of baicalein and 2%-10% w/w of chrysin. In a related embodiment, hypertriglyceridemia is caused by chemotherapeutics and hyperglycemia. In another preferred embodiment, the composition is formulated with pharmaceutically/nutraceutically acceptable excipients, adjuvants, diluents or carriers and administered orally in the form of tablets, capsules, syrups, gummies, powders, suspensions, emulsions, chewables, candies and eatables. In another related embodiment, the mammal is human.

In the most preferred embodiment the invention discloses a method of therapeutic management of epileptic seizures in mammals, said method comprising steps of administering effective concentration of a composition comprising not less than 10% w/w of oroxylin A, not less than 10% w/w of baicalein and not less than 2% w/w of chrysin, to mammals in need of such therapeutic management to mammals in need of such therapeutic management to bring about a reduction in the severity and occurrence of seizures. In a related embodiment, the composition preferably comprises 10%-15% w/w of oroxylin A, 10%-25% w/w of baicalein and 2%-10% w/w of chrysin. In a preferred embodiment, the mammal is human. In another preferred embodiment, the composition is formulated with pharmaceutically/nutraceutically acceptable excipients, adjuvants, diluents or carriers and administered orally in the form of tablets, capsules, syrups, gummies, powders, suspensions, emulsions, chewables, candies and eatables.

In another preferred embodiment, the invention discloses a composition comprising not less than 10% w/w of oroxylin A, not less than 10% w/w of baicalein and not less than 2% w/w of chrysin, for use in the therapeutic management of epileptic seizures in mammals. In a related aspect, the composition preferably comprises 10%-15% w/w of oroxylin A, 10%-25% w/w of baicalein and 2%-10% w/w of chrysin. In another related aspect, the composition is formulated with pharmaceutically/nutraceutically acceptable excipients, adjuvants, diluents or carriers and administered orally in the form of tablets, capsules, syrups, gummies, powders, suspensions, emulsions, chewables, candies and eatables. In yet another related aspect, the mammal is human.

In yet another preferred embodiment, the invention discloses a method for reducing the occurrence of seizures in mammals, said method comprising step of: a) identifying a mammal with incidence of seizures and b) administering effective concentration of a composition comprising not less than 10% w/w of oroxylin A, not less than 10% w/w of baicalein and not less than 2% w/w of chrysin, to said mammals to bring about a reduction in the severity and occurrence of seizures. In a related embodiment, the composition preferably comprises 10%-15% w/w of oroxylin A, 10%-25% w/w of baicalein and 2%-10% w/w of chrysin. In a related embodiment, the mammal is human. In another related embodiment, the composition is formulated with pharmaceutically/nutraceutically acceptable excipients, adjuvants, diluents or carriers and administered orally in the form of tablets, capsules, syrups, gummies, powders, suspensions, emulsions, chewables, candies and eatables.

In yet another preferred embodiment, the invention discloses a method for therapeutic management of seizure induced neurotoxicity in mammals, said method comprising step of: a) identifying a mammal with symptoms of neurotoxicity induced by seizures and b) administering effective concentration of a composition comprising not less than 10% w/w of oroxylin A, not less than 10% w/w of baicalein and not less than 2% w/w of chrysin, to said mammals to bring about an effect of improvement in the signs and features of neurotoxicity. In a related embodiment, the composition preferably comprises 10%-15% w/w of oroxylin A, 10%-25% w/w of baicalein and 2%-10% w/w of chrysin. In another related aspect, the signs and features of neurotoxicity include lower anti-oxidant effects, decreased mitochondrial function and increase in apoptosis of neurons. In a related embodiment, the mammal is human. In another related embodiment, the composition is formulated with pharmaceutically/nutraceutically acceptable excipients, adjuvants, diluents or carriers and administered orally in the form of tablets, capsules, syrups, gummies, powders, suspensions, emulsions, chewables, candies and eatables.

In yet another preferred embodiment, the invention discloses a method for preventing apoptosis in neuronal cells of mammals with epilepsy, said method comprising step of: a) identifying a mammal with signs and features of neurotoxicity induced by seizures and b) administering effective concentration of a composition comprising not less than 10% w/w of oroxylin A, not less than 10% w/w of baicalein and not less than 2% w/w of chrysin, to said mammals to prevent apoptosis of neurons. In a related embodiment, the composition preferably comprises 10%-15% w/w of oroxylin A, 10%-25% w/w of baicalein and 2%-10% w/w of chrysin. In another related aspect, prevention of apoptosis is brought about by decreasing caspase-1 and caspase-3 activity. In a related embodiment, the mammal is human. In another related embodiment, the composition is formulated with pharmaceutically/nutraceutically acceptable excipients, adjuvants, diluents or carriers and administered orally in the form of tablets, capsules, syrups, gummies, powders, suspensions, emulsions, chewables, candies and eatables.

The specific examples included herein below illustrate the aforesaid most preferred embodiments of the present invention.

Example 1: Hypotriglyceridemic Effects of Oroxylin a, Baicalein and Chrysin (OBC) on Chemotherapy Induced Memory Impairment The composition comprising oroxylin A, baicalein and chrysin (OBC), was isolated from *Oroxylum indicum* as per the process mentioned in US patent application no. U.S. Ser. No. 15/805,320.

Methodology: Mice received intraperitoneal (IP) injection of saline or chemotherapeutics (CT)—doxorubicin-2 mg/kg & cyclophosphamide-50 mg/kg one injection/week for 4 weeks. The composition comprising oroxylin A, baicalein and chrysin [250 mg/kg—low dose (LD) and 500 mg/kg—high dose (HD)] was mixed with powdered rodent food and fed daily for 4 weeks.

The mice serum samples were tested using an automated machine for the determination of hematological markers and other parameters to monitor liver and kidney functions.

TABLE 1

Hematological markers

| Parameters | Control | CT | CT + OBC (LD) | CT + OBC (HD) |
|---|---|---|---|---|
| Glucose | 165.00 ± 6.59 | 157.33 ± 3.59 | 202.33 ± 1.03 | 178 ± 0.44 |
| Cholesterol | 126.00 ± 1.79 | 126.66 ± 2.46 | 118 ± 1.18 | 115.33 ± 0.68 |
| Triglyceride | 166.33 ± 1.37 | 179.67 ± 2.29* | 142.67 ± 2.62 | 137.67 ± 1.81 |

*Indicates significant change p < 0.05

Chemotherapeutics significantly elevated triglyceride levels and OBC prevented chemotherapeutics effect. OBC may protect from drug-induced elevation of triglyceride levels.

Example 2: Effects of Composition Comprising Oroxylin a, Baicalein and Chrysin (OBC) on Hyperglycemia Induced Triglyceride Elevation The composition comprising oroxylin A, baicalein and chrysin (OBC), was isolated from *Oroxylum indicum* as per the process mentioned in US patent application no. U.S. Ser. No. 15/805,320.

Methodology: Rats received intraperitoneal (IP) injection of saline or streptozotocin (STZ) (55 mg/kg). The composition comprising oroxylin A, baicalein and chrysin (OBC) [250 mg/kg—low dose (LD) and 500 mg/kg—high dose (HD)] was mixed with powdered rodent food and fed daily for 4 weeks.

Blood samples were withdrawn from the rats before euthanization. These samples were immediately tested using an automated machine for the determination of hematological markers and other parameters to monitor liver and kidney functions.

TABLE 2

Hematological Markers

| Parameters | Control | STZ | STZ + OBC (LD) | STZ + OBC (HD) |
|---|---|---|---|---|
| Glucose | 190.4 ± 4.56 | 602.4 ± 48.79* | 509 ± 57.53 | 561.8 ± 29.91 |
| Cholesterol | 121.8 ± 3.07 | 141.6 ± 10.48 | 130.6 ± 8.22 | 151 ± 6.98 |
| Triglyceride | 129.8 ± 5.43 | 633.2 ± 156.9* | 334.2 ± 88.11 | 551.2 ± 65.05 |

*represent significant change p < 0.05

OBC significantly decreases the STZ-increased triglyceride levels. These results suggest that OBC may be useful in the management of blood triglyceride levels.

In conclusion, the composition comprising oroxylin A, baicalein and chrysin was very effective in ameliorating the symptoms of chemotherapy and hyperglycemia induced triglyceride elevation. U.S. patent application Ser. No. 16/009,490 and PCT application no. PCT/US18/37724 discloses the use of comprising oroxylin A, baicalein and chrysin in ameliorating the symptoms of chemotherapy and hyperglycemia induced cognitive dysfunction and memory impairment. A large body of evidence indicate that the enzyme monoamine oxidase (MAO) play an important role in neuroprotection. However, the exact mechanisms underlying the protective effects of MAOs in the brain are still unknown. Although reports indicate that over expression of MAOs in neurodegenerative diseases like Alzheimer's disease, Parkinson's disease and epileptic seizures, deficiency of the enzyme is also reported in the above mentioned conditions. The treatment methods that are generally employed are aimed at inhibiting the activity of MAOs and bioactive molecules that increase the activity of MAOs for ameliorating the symptoms are lacking. The composition comprising oroxylin A, baicalein and chrysin may also be very effective in modulating the levels of MAOs, which can be used for the management of many neurological diseases, specifically epilepsy.

Example 3: Anti-Epileptic Activity

Two-month-old male Sprague-Dawley rats were purchased from commercial vendor and housed at 25°±2° C., with the humidity maintained at 55%, wood chip bedding, on a 12:12 hour dark/light cycle, with free access to food and water. All animal procedures were carried out in accordance with NIH and Auburn University Animal Care and Use Committee guidelines. The rats were divided into four groups (1. Control, 2. Kainic acid (10 mg/kg), 3. LD (Low Dose)-composition containing OBC 250 mg/kg+Kainic acid, and 4. High Dose (HD)-composition containing OBC 500 mg/kg+Kainic acid). Composition containing OBC was mixed with powdered feed and administered orally for 2 weeks prior to kainic-acid administration. Administration of kainic acid has been shown to increase seizures as seen by increased Racine scores (Dawson and Wallace, Kainic acid-induced seizures in aged rats: neurochemical correlates. Brain Res Bull. 1992; 29(3-4):459-68; Eppler et al., Kainic acid (KA)-induced seizures in Sprague-Dawley rats and the effect of dietary taurine (TAU) supplementation or deficiency. Amino Acids. 1999; 16(2):133-47; Sharma et al., Mesial temporal lobe epilepsy: pathogenesis, induced rodent models and lesions. Toxicol Pathol. 2007; 35(7):984-99; French et al., Intrahippocampal kainic acid, seizures and local neuronal degeneration: relationships assessed in unanesthetized rats. Neuroscience. 1982; 7(10):2525-36; Jinde et al., Lack of kainic acid-induced gamma oscillations predicts subsequent CA1 excitotoxic cell death. Eur J Neurosci. 2009; 30(6):1036-55; Medvedev et al., Kainic acid induces distinct types of epileptiform discharge with differential involvement of hippocampus and neocortex. Brain Res Bull. 2000; 52(2):89-98). Typically, Racine scores include the following stages:

1. Mouth and facial movement
2. Head nodding
3. Forelimb clonus
4. Rearing with forelimb clonus
5. Rearing and falling with forelimb clonus (generalized motor convulsions)

Racine scores are acceptable scoring scale to validate the neuroprotective effects of synthetic or natural drugs for their efficacy against seizures.

In the present study, composition containing OBC (250 and 500 mg/kg, oral administration) dose dependently reduced the plethora of seizure activities induced by kainic acid (FIG. 1). Composition containing OBC significantly improved the reduced locomotion, increased muscle rigidity, salivation, teeth grinding, clonus and repetitive head/leg movement which are evaluated as a part of Racine scores.

Seizures have shown to affect the psychological and social behaviors, movement and consciousness. Untreated seizures have shown to increase the risk for morbidity and mortality. Composition containing OBC exhibits anti-seizure activity in addition to their neuroprotective effects (antioxidant, mitochondrial enhancing properties). Composition containing OBC can be used for the management of various types of seizures such as absence seizures (formerly known as petit mal), tonic-clonic or convulsive seizures (formerly known as grand mal), atonic seizures (also known as drop attacks), clonic seizures, tonic seizures and myoclonic seizures.

Example 4: Management of Neurotoxicity Induced by Seizure Activity

For the complete management of epilepsy, it is imperative to reduce the incidence of seizures and also to effectively manage and correct the damage to the neurons which is induced by recurrent seizure activity. Drugs which reduced the incidence of seizures may not effectively manage and correct the clinical conditions resulting from seizures. Failure to correct and manage such effects results in neurodegeneration. The ability of a composition comprising oroxylin A, baicalein and chrysin (OBC) [250 mg/kg—low dose (LD) and 500 mg/kg—high dose (HD)] to management of neurotoxicity associated by epilepsy was tested in kainic acid induced seizure rat model. The biochemical parameters like ROS, hydrogen peroxide, protein carbonyl levels, nitrite levels, glutathione content, mitochondrial activity, and caspase activity were estimated in the cortex of the rat models.

Figure 2:
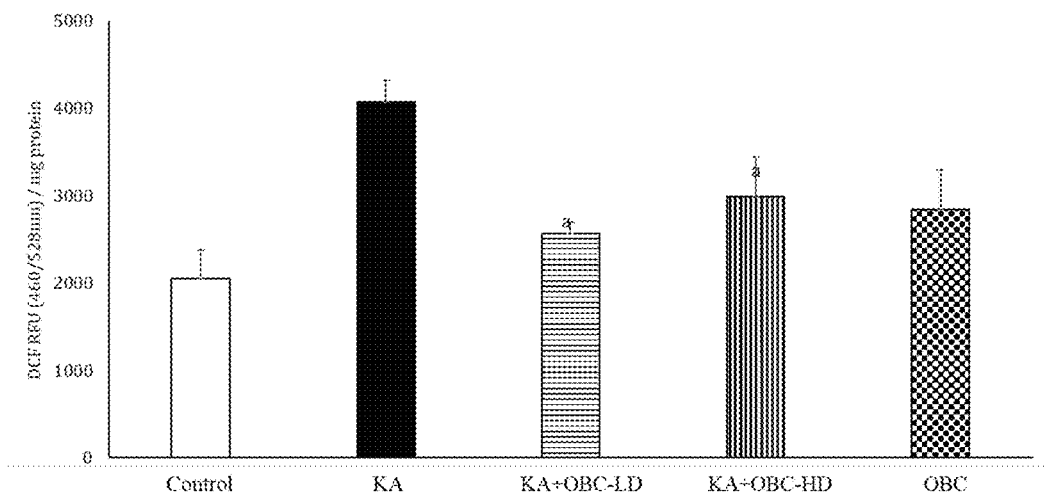
FIG. 2 is graphical representation showing the decrease in ROS levels in the brain cortex by the composition comprising oroxylin A, baicalein and chrysin (OBC) (250 and 500 mg/kg, oral administration, 2 weeks) on the kainic acid (KA)-induced seizure rat model.
Figure 3:
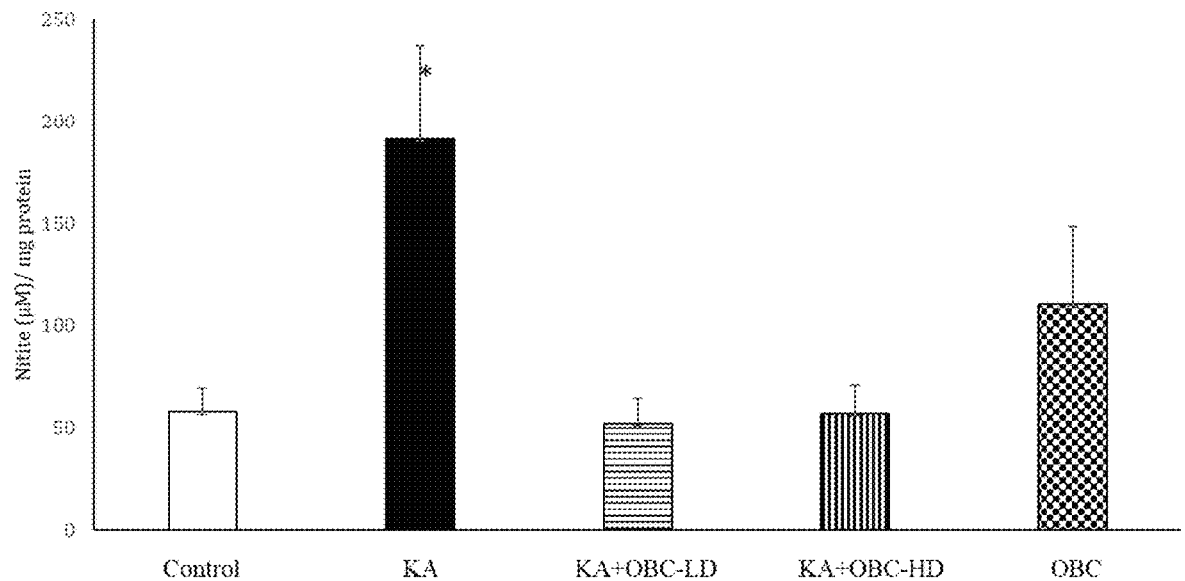
FIG. 3 is graphical representation showing the decrease in nitrite levels in the brain cortex by the composition comprising oroxylin A, baicalein and chrysin (OBC) (250 and 500 mg/kg, oral administration, 2 weeks) on the kainic acid (KA)-induced seizure rat model.
Figure 4:
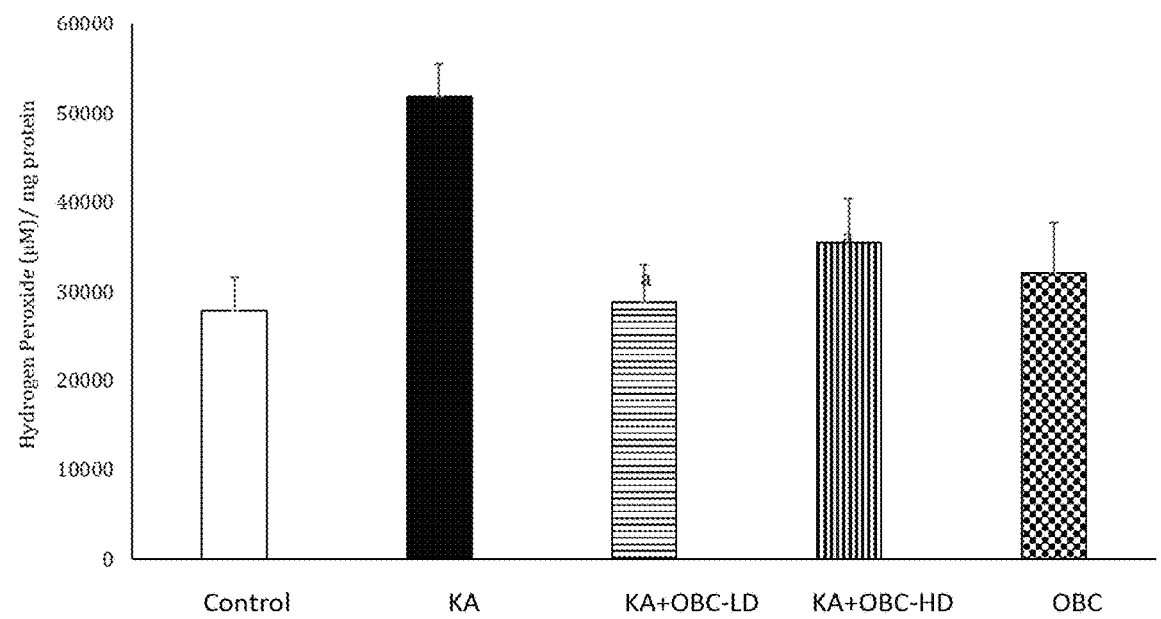
FIG. 4 is graphical representation showing the decrease in hydrogen peroxide levels in the brain cortex by the composition comprising oroxylin A, baicalein and chrysin (OBC) (250 and 500 mg/kg, oral administration, 2 weeks) on the kainic acid (KA)-induced seizure rat model.
Figure 5:
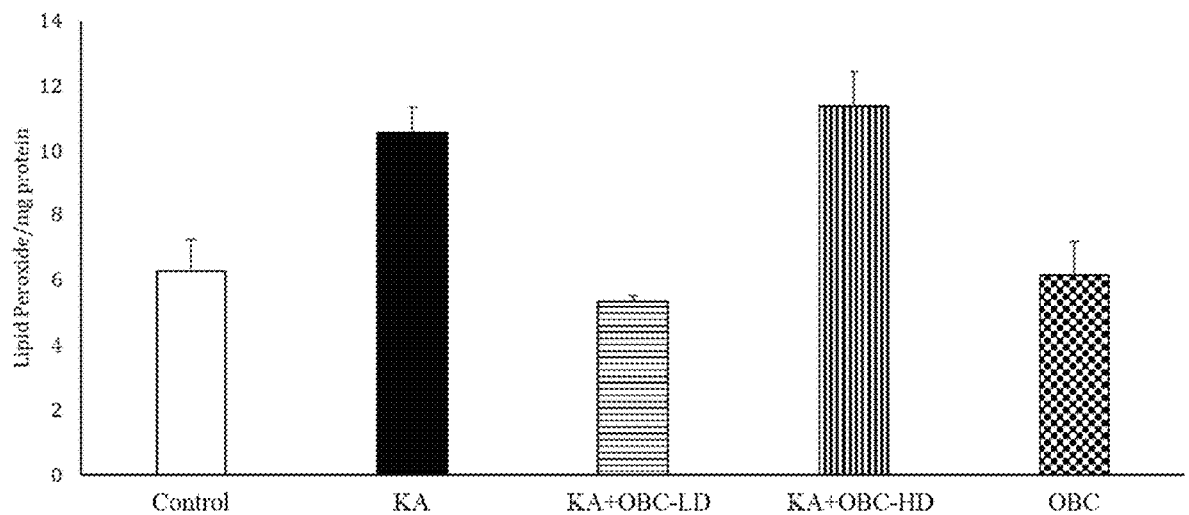
FIG. 5 is graphical representation showing the decrease in lipid peroxidation levels in the brain cortex by the composition comprising oroxylin A, baicalein and chrysin (OBC) (250 and 500 mg/kg, oral administration, 2 weeks) on the kainic acid (KA)-induced seizure rat model.
Figure 6:
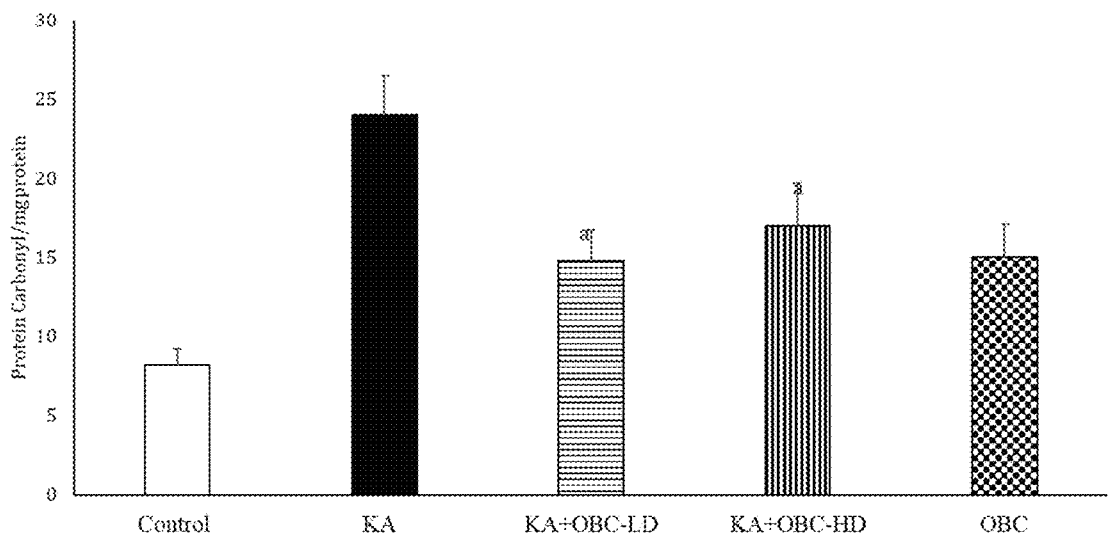
FIG. 6 is graphical representation showing the decrease in protein carbonyl content in the brain cortex by the composition comprising oroxylin A, baicalein and chrysin (OBC) (250 and 500 mg/kg, oral administration, 2 weeks) on the kainic acid (KA)-induced seizure rat model.
Figure 7:
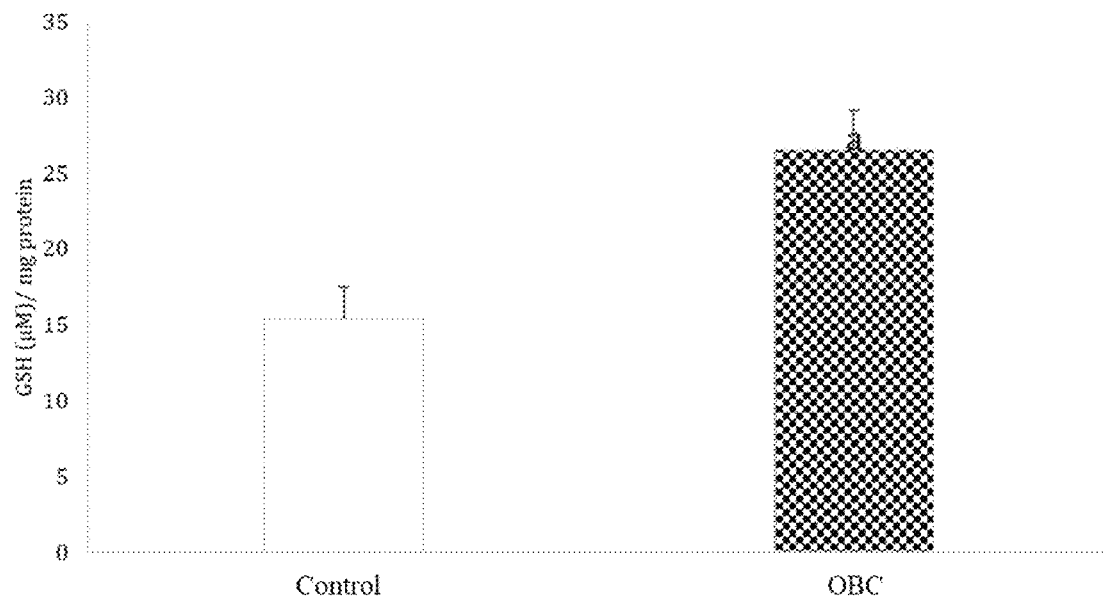
FIG. 7 is graphical representation showing the increase in glutathione levels in the brain cortex by the composition comprising oroxylin A, baicalein and chrysin on the kainic acid (KA)-induced seizure rat model.

Anti-oxidant effects: The Epileptic agent Kainic acid (KA) significantly increased the generation of ROS (FIG. 2), nitrite content (FIG. 3), hydrogen peroxide levels (FIG. 4), Lipid peroxidation (FIG. 5), protein carbonyl content (FIG. 6) and decreased the glutathione levels (FIG. 7) in the cortex of the brain as compared to the control. The composition comprising oroxylin A, baicalein and chrysin (OBC) effectively lowered the ROS, nitrite content, hydrogen peroxide levels, Lipid peroxidation, protein carbonyl content and increased the glutathione levels in the cortex of the brain thereby increasing the anti-oxidant effects in the brain of rats.

Figure 8:
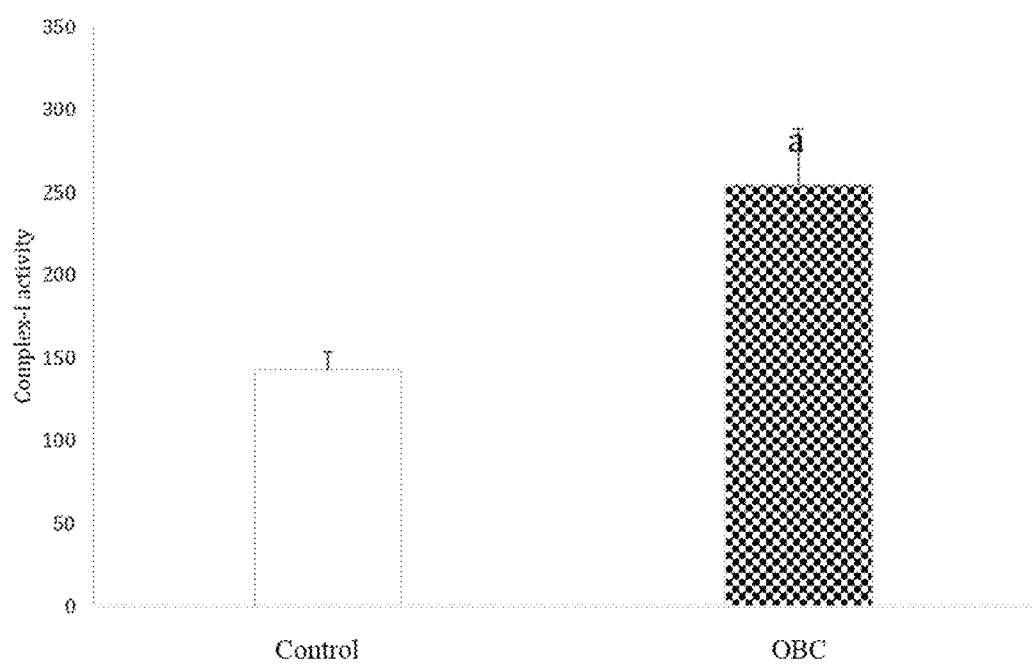
FIG. 8 is graphical representation showing the increase in mitochondrial complex 1 activity in the brain cortex by the composition comprising oroxylin A, baicalein and chrysin on the kainic acid (KA)-induced seizure rat model.

Mitochondrial function: The composition comprising oroxylin A, baicalein and chrysin (OBC) effectively increased the activity of the mitochondrial complex I in the cortex of the rat brain (FIG. 8) thereby increasing the mitochondrial function.

Figure 9:
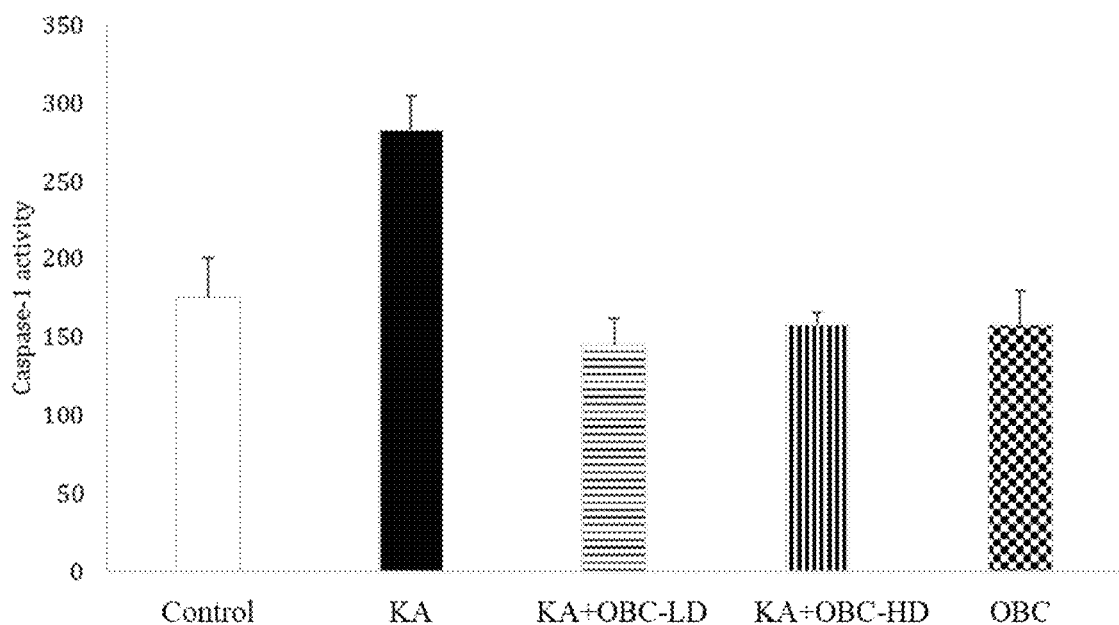
FIG. 9 is graphical representation showing the decrease in caspase 1 activity in the brain cortex by the composition comprising oroxylin A, baicalein and chrysin on the kainic acid (KA)-induced seizure rat model.
Figure 10:
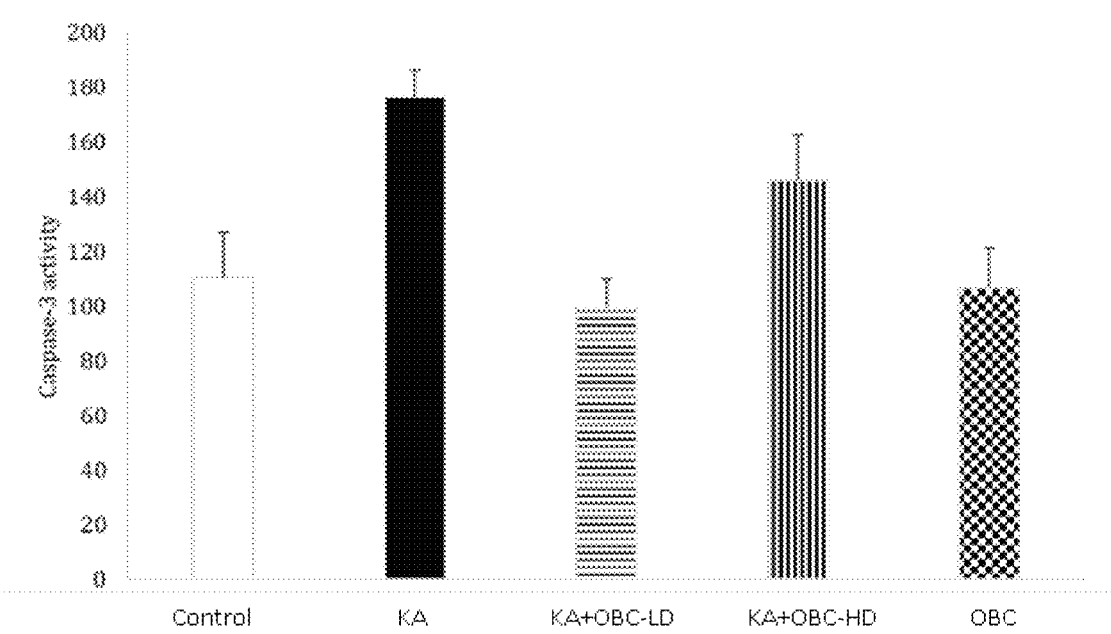
FIG. 10 is graphical representation showing the decrease in caspase 3 activity in the brain cortex by the composition comprising oroxylin A, baicalein and chrysin on the kainic acid (KA)-induced seizure rat model.

Anti-apoptotic effects: Kainic acid (KA) significantly increased the activity of caspase 1 (FIG. 9), and caspase 3 (FIG. 10) thereby leading to increased apoptosis of neurons compared to the control. The composition comprising oroxylin A, baicalein and chrysin (OBC) effectively lowered the activity of casapase 1 & 3 in the brain cortex thereby preventing apoptosis of neurons.

Overall, in addition to decreasing the occurrence of seizures, the composition comprising oroxylin A, baicalein and chrysin was also effective in managing the symptoms of neurotoxicity induced by seizures. The composition is thus a complete neuroprotective agent offering a complete protection in preventing mitigating the damage caused by seizures.

While the invention has been described with reference to a preferred embodiment, it is to be clearly understood by those skilled in the art that the invention is not limited thereto. Rather, the scope of the invention is to be interpreted only in conjunction with the appended claims.

We claim:

1. A method for preventing apoptosis in neuronal cells of mammals with epilepsy, said method comprising step of: a) identifying a mammal with signs and features of neurotoxicity induced by seizures and b) administering effective concentration of a composition comprising not less than 10% w/w of oroxylin A, not less than 10% w/w of baicalein and not less than 2% w/w of chrysin, to said mammals to prevent apoptosis of neurons.

2. The method as in claim 1, wherein the composition comprises 10%-15% w/w of oroxylin A, 10%-25% w/w of baicalein and 2%-10% w/w of chrysin.

3. The method as in claim 1, wherein prevention of apoptosis is brought about by decreasing caspase-1 and caspase-3 activity.

4. The method as in claim 1, wherein the mammal is human.

* * * * *